(No Model.)
W. W. HANSCOM, Dec'd.
A. P. HANSCOM, Executrix.
HOSE COUPLING.
No. 408,409.  Patented Aug. 6, 1889.
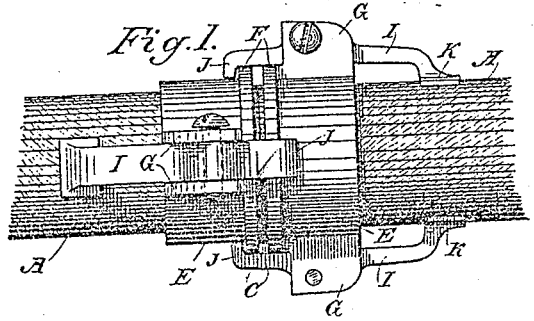
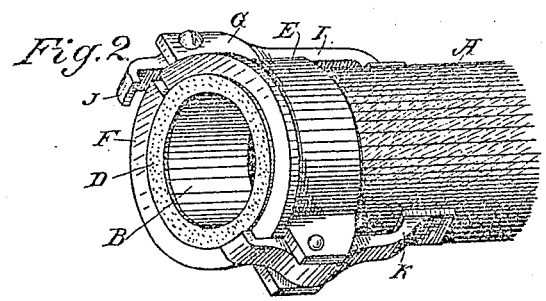
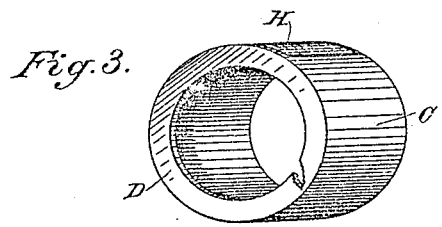
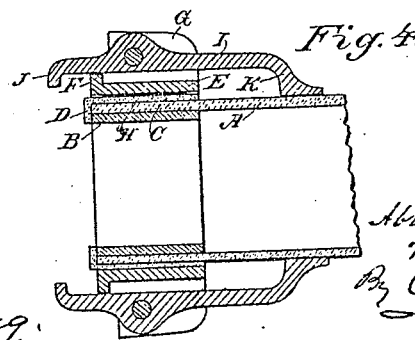
Witnesses.
Geo. H. Strong.
J. B. House.
Inventor,
Abbie P. Hanscom, Ex'x.
of Wm. W. Hanscom dec'd
By Dewey & Co.
Att'ys

UNITED STATES PATENT OFFICE.

ABBIE P. HANSCOM, OF SAN FRANCISCO, CALIFORNIA, (EXECUTRIX OF WILLIAM W. HANSCOM, DECEASED,) ASSIGNOR TO H. D. BACON, OF SAME PLACE.

HOSE-COUPLING.

SPECIFICATION forming part of Letters Patent No. 408,409, dated August 6, 1889.

Application filed March 20, 1889. Serial No. 304,064. (No model.)

*To all whom it may concern:*

Be it known that WILLIAM W. HANSCOM, (deceased,) late of the city and county of San Francisco, State of California, did invent a new and useful Improvement in Hose-Couplings, of which the following is a specification.

This invention relates to an improved construction of hose-couplings, and is especially applicable in making the couplings of pipes which are to convey air or other elastic medium, as in the case of pipes for air-brakes.

It consists of flexible coupling-pipes with collars fitted upon the meeting ends of the pipes to be coupled, and having thin flexible flanges projecting a short distance from the periphery toward the center of these ends, so that when the ends are brought together and retained in this position the pressure from within the pipe will force these flanges together and prevent leakage.

The exteriors of the pipes are encircled by metal collars having lugs upon opposite sides and hook-levers fulcrumed between these lugs, so that the hooks of the levers fulcrumed upon the collar of one pipe will engage with the flange of the opposite pipe and hold them together. The opposite ends of the levers are bent so as to rest upon the elastic surface of the flexible pipe, and the pressure within the pipe acts upon these levers so as to retain the hooks in engagement with the opposite flanges.

Referring to the accompanying drawings for a more full explanation of this invention, Figure 1 is a view of the coupling with the parts connected together. Fig. 2 is a perspective view of one of the coupling-sections, showing the metal collar with its levers and the flexible joint-flange of the inner flexible collar. Fig. 3 shows the flexible joint-collar removed from the end of the pipe. Fig. 4 is an ordinary section taken through the end of the pipe, showing the relative arrangement of all the parts and the interior rigid collar.

A A are the flexible hose-pipes which are to be coupled together. Within the ends of these pipes are fitted the inflexible rings or collars B, which, as shown in the present case, have their outer ends flush with the outer ends of the flexible pipes.

C is a flexible collar, made of rubber or other suitable material and of sufficient size to slip easily over the outer end of the flexible pipe A.

D is a thin flange formed with or upon the collar C, and projecting a short distance toward the axis of the collar of the pipe which it surrounds, and at right angles with the collar, so that when it is in place this flange covers the end of the pipe A.

E is a metal collar having an exterior flange F at its outer end, and being provided with lugs G upon opposite sides, as shown. This collar is preferably slotted upon one side between one pair of lugs, and is of sufficient interior diameter to slip over the hose-pipe A, and also over the exterior flexible collar C. This flexible collar C is preferably provided with a thin plate of metal H, which is intended to pass beneath the open slot of the exterior collar and to protect the rubber collar from being pinched, wrinkled, or cut at this point when the outer collar is clamped upon it.

Between the lugs G on this exterior collar are fulcrumed the levers I, having hooks J upon the ends which project beyond the flange of the collar, and having the opposite ends bent inwardly, as shown at K, so that they may rest upon the surface of the hose A at a short distance behind the collars to which they are fulcrumed. Each of the meeting ends of the hose-sections A are provided in like manner with the flexible collars and flanges, and with the exterior rigid collars with the lugs and levers.

When the exterior rigid collar has been brought to its proper position upon the end of the hose-pipe, it is clamped thereon by means of the screw which passes through the separated lugs upon the outer collar. By means of this screw the collar is drawn together, so as to be clamped firmly upon the end of the hose, leaving the inner flexible collar and its flange projecting a slight distance beyond the end of the metal exterior collar. It will be seen that when these two ends of the sections to be connected together are brought together by pressing the rear ends of the levers downward upon the hose the latter will be compressed sufficiently to allow the hooks to project over the metal flange of the opposing coupling, and when released the elasticity of the hose will separate the inner ends of the levers so as to force the hooks down over the flanges and thus lock the two together.

If two sets of levers are used, they will stand at right angles with each other, one pair upon one coupling and the other pair upon the other coupling. The flexible flanges and the interior collars will abut together, and when interior pressure is brought upon them, by the flow of air or other medium through the hose, it will force these two flanges D together, so as to make a perfectly tight joint, and the pressure upon the interior of the hose will insure the levers being separated at their rear ends, so as to cause the hooked outer ends to lock firmly over the opposing metallic flanges, as before described.

When desired to release the couplings, it is only necessary to press the rear ends of the levers together sufficiently to overcome the elastic resistance of the hose-sections A, when the outer or hooked ends will be released, and the hose-sections can then be easily separated. In case of accident this will also separate with any unusual strain.

Having thus described the invention, what is claimed as new, and desired to be secured by Letters Patent, is—

1. A connection for hose-sections, consisting of flanged collars secured upon the ends of the hose-sections, having levers fulcrumed thereon, said levers having hooks upon the outer ends to engage the flanges of the opposing collar, and having the inner ends extended rearwardly behind the collar and bent so as to press upon the surface of the hose and be separated thereby, substantially as herein described.

2. A hose-coupling consisting of the rigid collars fitted into the ends of the hose, with flexible collars fitting the outside of the hose, having the inwardly-projecting flanges, in combination with the exterior rigid collars clamped upon the ends of the hose and the flexible collars and having outwardly-turned flanges, and the hooked levers fulcrumed upon said exterior collars, so that the hooks will engage the flanges of the opposing coupling, while the inner ends of the levers are acted upon by the elastic hose-sections which are coupled thereby, substantially as herein described.

In witness whereof I have hereunto set my hand.

ABBIE P. HANSCOM,
*Executrix of the last will and testament of William Wallace Hanscom, deceased.*

Witnesses:
F. A. BERLIN,
LEE D. CRAIG.